July 26, 1932. E. A. REED 1,869,279
CASTER
Filed Jan. 12, 1931
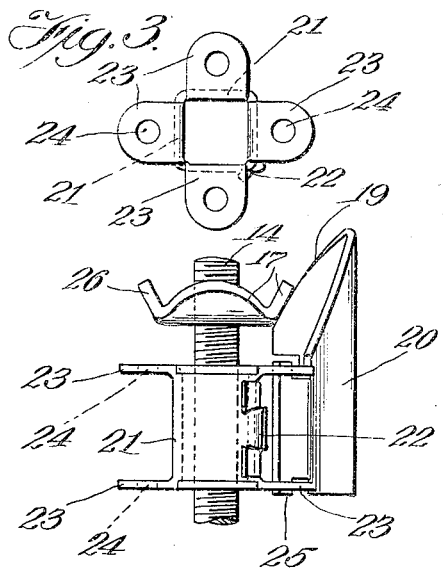
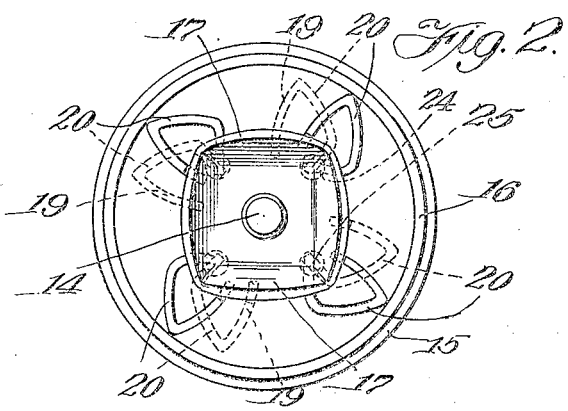
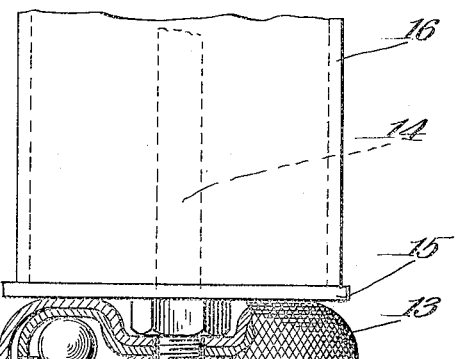
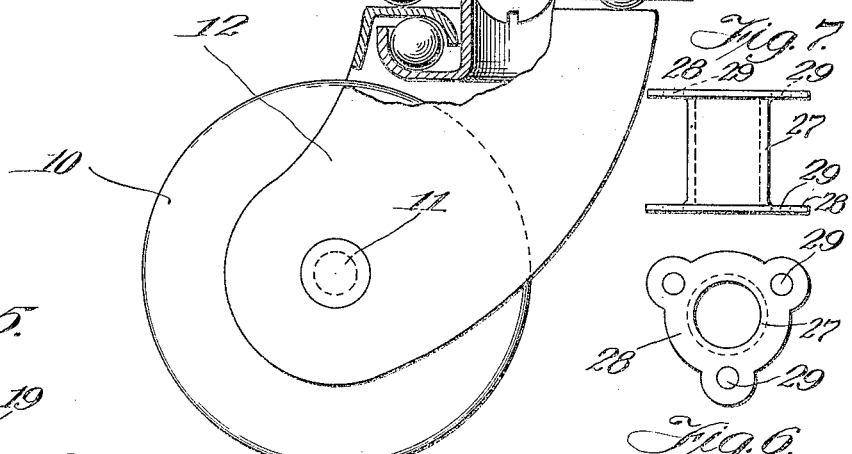
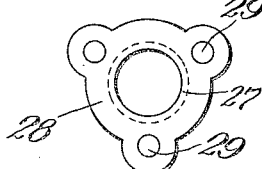
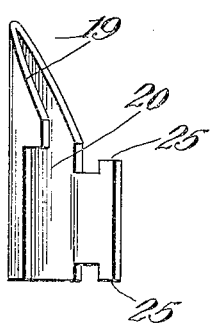
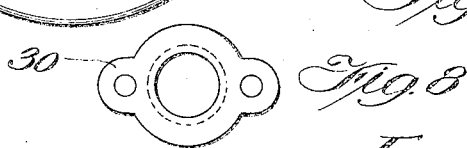
Inventor
Edward A. Reed.
By George Bayard Jones
Atty Patented July 26, 1932

1,869,279

UNITED STATES PATENT OFFICE

EDWARD A. REED, OF BROOKFIELD, ILLINOIS, ASSIGNOR TO HARRIS AND REED MANUFACTURING COMPANY, A CORPORATION OF ILLINOIS

CASTER

Application filed January 12, 1931. Serial No. 508,035.

My invention relates to improvements in casters and particularly to that type of caster in which the upper part, or so called "adapter" may be caused to expand to fit into and grip the hollow leg of an article of furniture such as the leg of a bed, for example.

In devices in use at the present time, the adapter has a very limited range of expansion, and in many cases requires a wrench to tighten it in place. Also, the expanding elements are usually made of resilient material and whether resilient or otherwise, are caused to expand radially with the result that they do not maintain themselves in position indefinitely but are apt to loosen after a certain period of use.

The general object of my invention is to provide an improved caster in which the adapter has a wide range of expansion and maintains a firm grip throughout an indefinite period of use.

A subsidiary object is to provide a caster of this type with members which do not expand radially but which are pivoted or hinged to swing about the arc of a circle and are quickly and easily installed without the use of tools.

Other objects and advantages will be apparent from the following description of several embodiments of the invention.

Fig. 1 is a side elevation of one form of the invention;

Fig. 2 is a top plan view thereof;

Fig. 3 is a top plan view of the central member which supports four pivoted members;

Fig. 4 is an elevation thereof with one of the pivoted members in place;

Fig. 5 is an elevation of one of said pivoted members;

Fig. 6 is a top plan view of a modified supporting member on which three hinged members may be mounted;

Fig. 7 is an elevation thereof; and

Fig. 8 is a top plan view of a further modification.

The caster comprises the usual wheel 10 of any suitable form, rubber tired or otherwise, arranged to rotate about a shaft 11, journaled in the fork 12. A plate 13 is arranged at the top of said fork and has a knurled flange to enable it to be grasped conveniently, and carries a centrally located screw threaded shaft 14 such as a bolt or a screw, for example, which projects upwardly from the yoke 12. A plate 15 is also provided which supports the hollow leg 16 of the structure to which the caster is applied, such, for example, as the tubular leg of a metal bed.

A nut 17 is mounted on the screw 14 and when drawn downwardly by rotation of said screw, it bears against the inclined upper extremities 19 of a plurality of hinged members 20. In the embodiment of the invention illustrated in Figs. 1 to 5, there are four such hinged members, although a greater or less number may be employed.

These hinged members are supported by a central tubular member 21, made preferably of sheet metal, bent around and interlocked at 22 and having four outwardly bent lips 23 at the top and bottom, each of which lips has an opening 24 to receive an extension 25 on a pivoted member 20. As will be seen, there are a pair of such extensions on each member 20 extending in opposite directions to form journals whereby said members 20 may swing about a vertical axis.

In the top plan view the pivoted members 20 are substantially V shaped, one of the edges 19 being so disposed as to be nearly radial with reference to the screw 14 when the four members are in innermost position, i. e. when they are drawn in as closely toward the center as possible. The nut 17 has its edges turned up to form four inclined portions 26 each adapted to bear against one of the inclined surfaces 19. By rotating the knurled flange 13, the screw 14 is turned and the nut 17 thus drawn downwardly causing the four pivoted or hinged members 20 to swing outwardly until they engage the inner surface of the tubular member 16 as shown in Fig. 2. It will be seen that said four members do not move radially outwardly but swing about their pivots 25, the outermost parts describing an arc of a circle until they are forced into firm engagement with the inner surface of the tubular member 16 by a sliding motion which serves to wedge them in place.

To disengage the caster from the tubular member the knurled flange may be turned by hand in the opposite direction to relieve the clamping engagement.

In the structure described there are four pivoted members 20 but a greater or less number may be employed. In Figs. 6 and 7 I have shown a central support or frame adapted to receive three such pivoted members. It consists of cylindrical member 27 with an upper and lower plate 28—28 thereon having three extensions or ears 29 with openings to pivotally support the three pivoted members.

Fig. 8 shows a top plan view of a further modified central support having two oppositely extending ears 30 for a similar purpose.

It will be seen that the adapter has a fairly wide range of expansion which enables it to be used with hollow legs of various different sizes. In fact two different adapters will suffice for practically all the different sizes of hollow legs that are met with in commercial practice. The adapter need not necessarily be applied to a caster wheel but to various other structures such for example as gliders, cushions and other devices attached to the lower end of the legs of furniture.

I claim:

1. A caster comprising a base having a wheel thereon, a structure associated with said base to swivel about a vertical axis and a gripping member pivoted to said structure to turn about a vertical axis eccentric with reference to said first axis.

2. A caster comprising a base having a wheel thereon, a frame connected thereto whereby it may swivel about a vertical axis and a plurality of gripping members pivoted to said frame to turn about vertical axes eccentric with reference to said first axis.

3. A caster comprising a base having a wheel thereon, a superstructure mounted on said base to swivel about a vertical axis and a plurality of gripping members pivoted to said superstructure spaced equally about the circumference thereof and means for swinging said gripping members about their pivots.

4. A caster comprising a wheel yoke, a vertical screw threaded rod supported thereby, a nut on said rod, a member surrounding said rod between said nut and said yoke and a plurality of gripping devices hinged to said member whereby said nut may be moved toward said yoke to swing said gripping devices outwardly.

5. A caster comprising a wheel yoke, a vertical screw threaded rod thereon, a hollow member surrounding said rod, a plurality of gripping devices hinged to said member each having a cam surface adjacent its upper end and a nut on said rod above said member arranged to engage said cam surfaces to operate said gripping devices.

6. In a caster, a base, a screw threaded rod projecting upwardly therefrom, a structure surrounding said rod having lips thereon, V shaped gripping members pivotally supported by said lips and a nut on said rod to engage said gripping members.

7. In a caster a supporting frame, a plurality of V shaped gripping members pivoted thereto near one edge of each member, the other edge being inclined to form a cam surface.

8. In a caster a screw threaded shank, a frame surrounding the same, a plurality of V shaped members, one leg of each V shaped member being longer than the other and being pivoted to said frame, the other leg having an inclined upper portion serving as a cam surface and a nut on said shaft to engage said cam surfaces.

9. A caster comprising a flanged member, a screw threaded spindle extending upwardly therefrom, a disc on said flanged member, a frame surrounding said screw threaded spindle and resting on said disc and having laterally projecting lugs, gripping members pivotally supported by said lugs and each having a cam surface thereon and a nut on said spindle to engage said cam surfaces and thereby swing said gripping members about their pivots to increase the effective diameter of the structure.

In testimony whereof, I have subscribed my name.

EDWARD A. REED.